June 10, 1941.  G. R. MARSHALL  2,245,350
SACRAL FORAMINA FINDER
Filed May 23, 1939
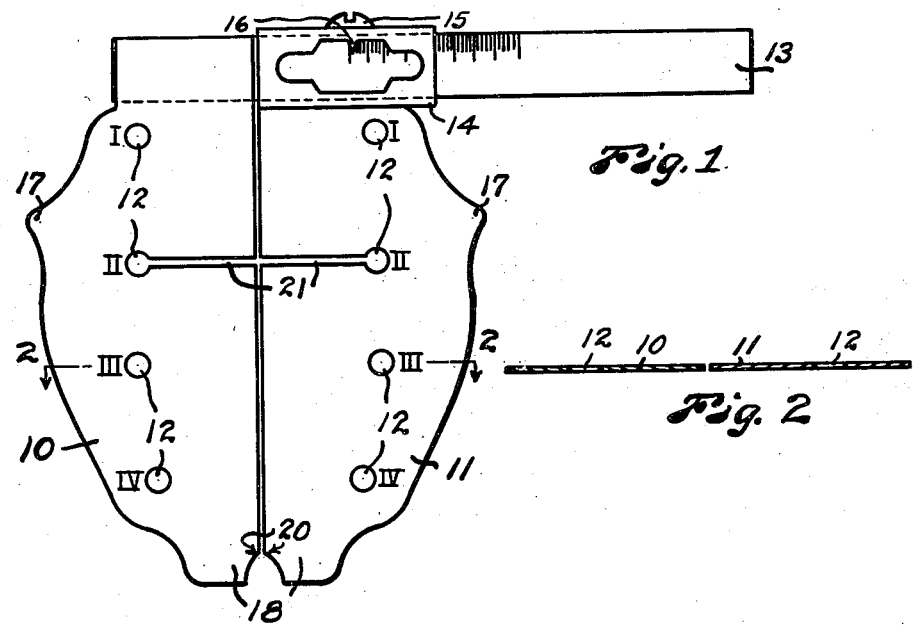
Fig. 1.
Fig. 2.
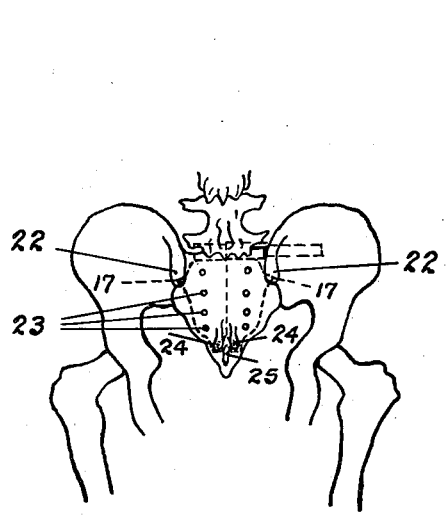
Fig. 3
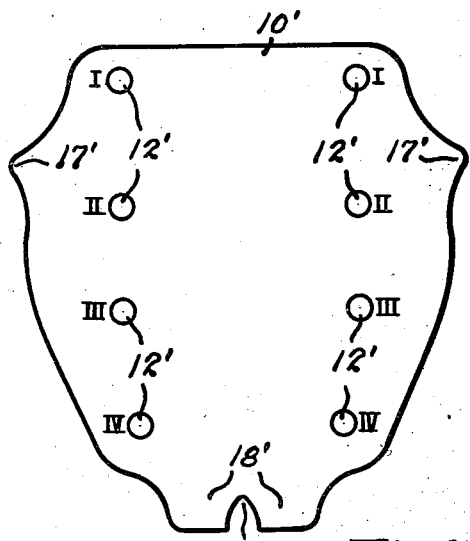
Fig. 4
INVENTOR.
George R. Marshall
BY
Fred C. Matheny
ATTORNEY Patented June 10, 1941

2,245,350

UNITED STATES PATENT OFFICE 2,245,350

SACRAL FORAMINA FINDER

George R. Marshall, Seattle, Wash.

Application May 23, 1939, Serial No. 275,177

6 Claims. (Cl. 33—189)

This invention relates to a sacral foramina finder adapted to be used in facilitating transsacral block anesthesia and sacral block anesthesia.

Sacral block anesthesia is the term applied to the combined procedure of caudal block and transsacral block anesthesia. Caudal block is produced by injecting the anesthetic into the caudal canal. Transsacral block is produced by injecting the anesthetic through the posterior sacral foramina. All of these forms of anesthesia or block affect the human body chiefly from the waist down and are very useful in rectal and like operations on parts of the body below the waist. This invention is concerned chiefly with transsacral block anesthesia as it solves the problem of locating the sacral foramina. The posterior sacral foramina are a plurality of small openings in the sacrum disposed in substantially symmetrical relation on each side of the body. The posterior sacral foramina through which transsacral block is administered are eight in number disposed in substantial alignment, four on each side of the line of the spine. The positioning and spacing of these sacral foramina are substantially constant for different adults of the same sex and approximately the same size. The transverse spacing between the sacral foramina on the two sides of the body is greater in women than in men. Transverse and longitudinal spacing may both vary somewhat in proportion to the size of the individual and for children will vary with the size and age of the child.

The posterior sacral foramina are covered by a layer of flesh of such thickness as to make it very difficult to locate these openings for the purpose of inserting therethrough a needle by which the anesthetic is administered. The technical difficulty of accurately locating these openings has heretofore been such a serious obstacle to the use of transsacral block that this form of anesthesia has not been generally used although it is admittedly a safer type of anesthesia than is any form of anesthesia in which the anesthetic enters the spinal canal.

The sacral foramina can not be located with the fingers by the sense of touch or palpation but there are certain adjacent bone protuberances which bear a known and almost constant relation to the sacral foramina which can easily be located by palpation and it is these protuberances which this invention utilizes as points of reference or landmarks to determine the positioning of an instrument by which the sacral foramina can be located with sufficient accuracy to make it easy to administer anesthetic therethrough. The chief reference points employed are two transversely spaced apart bony protuberances on the illium known as the posterior superior spines of the illium or as the posterior illiac spines. Two other reference points also used are two bony protuberances on the lower portion of the sacrum known as the sacral cornua.

It is an object of this invention to provide a simple and efficient instrument by the use of which a surgeon or person skilled in surgical arts can accurately locate the sacral foramina so that no difficulty will be experienced in inserting a needle therethrough for the purpose of administering an anesthetic.

It is a further object of this invention to provide an instrument of this nature which is adjustable so that the same instrument may be used for both men and women and for persons of different size.

Other and more specific objects of the invention will be apparent from the following description taken in connection with the accompanying drawing.

In the drawing Figure 1 is a plan view of an instrument constructed in accordance with my invention.

Fig. 2 is a sectional view on broken line 2—2 of Fig. 1.

Fig. 3 is a diagrammatic view on a smaller scale showing parts of the bones of the human body and showing by dotted lines this instrument in an operative position as respects said bones.

Fig. 4 is a plan view of an instrument of this type made in a single piece.

Like reference numerals designate like parts throughout the several views.

In Figs. 1, 2 and 3 I show an instrument comprising two similar plates 10 and 11 divided on a medial line to permit lateral spread and each having four foramina or openings 12 therein positioned so as to correspond to the positions of the sacral foramina of the average human adult. Preferably the openings 12 are numbered "I, II, III, and IV," to designate the first, second, third and fourth sacral foramina respectively. Considered jointly, the two plates 10 and 11, when positioned close together, are substantially the size and shape of the average adult sacrum and I find it satisfactory to construct these plates of thin slightly flexible metal.

One of the plates, as plate 10, is secured to a scale member 13 and the other plate 11 is secured to a slide member 14 which is slidable on the scale member 13. This mounts the two plates 10 and 11 in such a manner that they may be moved toward and away from each other to vary the distance between the openings 12 in said two plates. A screw 15 is provided for clamping the slide 14 to the scale 13 to hold the two plates in any desired adjusted position. Graduations on the scale 13 may be read with reference to an indicator point 16 on the slide 14 to indicate the amount of separation of the two plates 10 and 11. The plates 10 and 11 are respectively provided with indicators 17 and the indicators 17 are located on the plates so that when said indicators are positioned over the posterior superior spines of the illium then the openings 12 in the plates will be substantially over the sacral foramina. Obviously the plates may be adjusted toward and away from each other to properly position both indicators 17 as respects the two posterior superior spines of the illium. Each plate 10 and 11 is further provided adjacent the lower end thereof, with other indicators 18 adapted to be placed in predetermined relation to the sacral cornua to help secure a correct positioning of the plates. These other indicators 18 may be a flat portion or lobe on the lower part of each plate.

Also means is preferably provided in the lower portion of the plates to facilitate the location of the sacral hiatus so that this location may be marked to serve as a guide in administering caudal block anesthesia, in which the needle must be inserted into the caudal canal. This means may consist of notches 20 in the two plates 10 and 11.

Preferably two transverse slots 21 extend from the adjacent edges of the respective plates 10 and 11 to the number "II" openings 12 in said plates. These slots 21 indicate substantially the lower extremity of the average dural sac and thus provide an indicating means by which a mark may be made to enable the operator to judge distances and avoid inserting the needle far enough for it to enter the dural sac when said needle is inserted into the caudal canal for administering caudal block. Also these slots permit this instrument to be properly positioned on a patient while two needles are within the sacral foramina as hereinafter explained.

In Fig. 3 I have shown, by dotted lines the position of this instrument when in use. In this figure the posterior superior spines of the illium are indicated by 22 and the sacral foramina by 23. Also the sacral cornua are indicated by 24 and the sacral hiatus by 25.

In the use of this instrument the size and sex of the patient are taken into consideration and the two plates 10 and 11 relatively adjusted accordingly. The instrument is then placed on the back of the patient with the two indicator points 17 over the two protruding posterior superior spines of the illium, further adjustment between the two plates being made if necessary. Also the two indicators 18 are positioned in vertical alignment with the sacral cornua. It is to be noted that the indicators 18 can not always be positioned directly over the sacral cornua when the points 17 are on the illiac spines as the longitudinal distance between the illiac spines and the sacral cornua may be too great or to little. Under such circumstances the points 17 are placed over the illiac spines and the portions 18 are positioned in vertical alignment with the sacral cornua to properly align the instrument. When the instrument is positioned as above set forth the openings 12 will be substantially over the sacral foramina and marks on the body of the patient will preferably be made at the location of all of these openings 12. The instrument will then be removed and needles inserted at the locations marked. Usually no difficulty will be encountered in finding the sacral foramina as these foramina will be substantially under the marks. However, I prefer to first insert the two needles in the second foramina corresponding to the openings 12 numbered "II" on the instrument and if any difficulty is encountered in finding these foramina I apply the instrument over these two needles, after they have been properly inserted, and correct the remainder of the markings. After this has been done the other needles are always easily inserted. Obviously the device may be used by first marking on the body of the patient the locations of the second sacral foramina, then inserting the two needles at these locations, then reapplying the instrument over these needles, marking on the body of the patient the location of the other foramina and inserting the other needles.

The mark for the sacral hiatus is made substantially mid way between the two sacral cornua. The several marks may be made in any approved manner such as by the use of a sterilized indelible pencil.

It has been found to be easy to administer transsacral block where this instrument is used as a guide in the location of the sacral foramina but it is difficult to locate the sacral foramina without the use of the instrument.

In Fig. 4 I have shown an instrument similar to that disclosed in Figs. 1 to 3 except that it is made in a single piece and is not adjustable. This instrument comprises a plate 10' having openings 12' to indicate the location of the sacral foramina. Indicators 17' and 18' corresponding to the indicators 17 and 18 of Figs. 1 and 3 are also provided in connection with plate 10'. Also an opening 20' may be provided in plate 10' to assist in determining the location of the sacral hiatus. The operation of the instrument shown in Fig. 4 is similar to the operation of the instrument shown in Figs. 1 to 3 except that the instrument shown in Fig. 4 is not adjustable and will be made in different sizes to conform to the different measurements of men and women and of individuals of different size. Also the instrument shown in Fig. 4 can not be applied over needles which are already inserted in the sacral foramina.

The foregoing description and accompanying drawing clearly disclose a preferred embodiment of my invention but it will be understood that this disclosure is merely illustrative and that such changes may be made as are within the scope and spirit of the following claims.

I claim:

1. A sacral foramina finder for application to the human body to locate the posterior sacral foramina and facilitate the administration of transsacral block anesthesia, comprising plate means; means indicating two reference points on opposite sides of the vertical center line and near the upper end portion of said plate means to be placed in a predetermined position with respect to the posterior superior spines of the illium; and means provided by said plate means for indicating the correct location of the posterior sacral foramina when said plate means is positioned with said reference points in proper relation to the posterior superior spines of the illium.

2. A sacral foramina finder for application to the human body to locate the posterior sacral foramina and facilitate the administration of transsacral block anesthesia, comprising a plate; means indicating a reference point toward one side portion and near the upper end portion of said plate to be placed in a predetermined position with respect to the posterior superior spines of the illium, means indicating another reference point near the lower end portion of said plate to be placed in a predetermined position relative to the sacral cornua; and means provided by said plate for indicating the position of the sacral foramina when said first mentioned and said last mentioned reference points are correctly positioned relative to the posterior superior spines of the illium and the sacral cornua respectively.

3. A sacral foramina finder for application to the human body to locate the posterior sacral foramina and the sacral hiatus and facilitate the administration of sacral block anesthesia, comprising a plate; means indicating a reference point toward one side portion and near the upper end portion of said plate to be placed in a predetermined position with respect to the posterior superior spines of the illium, means indicating another reference point near the lower end portion of said plate to be placed in a predetermined position relative to the sacral cornua; means provided by said plate for indicating the position of the sacral foramina when said first mentioned and said last mentioned reference points are correctly positioned relative to the posterior superior spines of the illium and the sacral cornua respectively; and means provided by said plate for indicating the position of the sacral hiatus when said last named reference points are positioned substantially over the sacral cornua.

4. A sacral foramina finder for application to the human body to locate the posterior sacral foramina and facilitate the administration of transsacral block anesthesia, comprising plate means; means indicating two reference points on opposite sides of the vertical center line and near the upper end portion of said plate means to be placed in a predetermined position relative to the posterior superior spines of the illium, said plate means having a plurality of openings therein disposed and arranged in said plate means so that they will be positioned over the sacral foramina when said reeference points are correctly positioned relative to said posterior superior spines of the illium, whereby marks made through said openings will indicate the positions of the sacral foramina.

5. A sacral foramina finder for application to the human body to locate the posterior sacral foramina and facilitate the administration of transsacral block anesthesia, comprising two plates positioned in the same plane; means connecting said two plates for adjustment toward and away from each other; means indicating two transversely spaced apart reference points near the upper end portions of the respective plates to be placed in a predetermined position relative to the posterior superior spines of the illium; and means provided by said plates for indicating the correct position of the posterior sacral foramina when said plates are positioned with said reference points in proper relation to the posterior superior spines of the illium.

6. A sacral foramina finder for application to the human body to locate the posterior sacral foramina and facilitate the administration of transsacral block anesthesia, comprising two plates disposed in a common plane and having openings therein relatively positioned to correspond to the relative positions of the posterior sacral foramina; means connecting said two plates for relative adjustment toward and away from each other laterally and in the same plane; two aligned transverse slots in the respective plates extending from the adjacent edges of the plates to corresponding openings in the plates whereby the plates may be positioned over previously inserted needles; and means indicating two transversely spaced apart reference points near the upper end portions of the respective plates to be placed in a predetermined position relative to the posterior superior spines of the illium to locate the openings in said plates substantially over the sacral foramina.

GEORGE R. MARSHALL.